(12) United States Patent
Onojima et al.

(10) Patent No.: US 6,502,384 B1
(45) Date of Patent: Jan. 7, 2003

(54) SIDE THRUSTER OF FLYING OBJECT

(75) Inventors: Noboru Onojima; Hitoshi Tezuka, both of Gunma-ken; Akira Osada, Saitama-ken; Ichiro Yamaguchi, Gunma-ken, all of (JP)

(73) Assignee: IHI Aerospace Co., Ltd., Tokyo (JP)

( * ) Notice: Subject to any disclaimer, the term of this patent is extended or adjusted under 35 U.S.C. 154(b) by 105 days.

(21) Appl. No.: 09/657,909

(22) Filed: Sep. 8, 2000

(30) Foreign Application Priority Data

Sep. 30, 1999 (JP) .......................................... P11-279227

(51) Int. Cl.[7] ................................................ F02K 1/00
(52) U.S. Cl. .............................. 60/229; 60/234; 60/254
(58) Field of Search .......................... 60/229, 233, 234, 60/235, 253, 254, 228

(56) References Cited

U.S. PATENT DOCUMENTS

| | | | | |
|---|---|---|---|---|
| 3,532,297 A | * | 10/1970 | Maes | 244/1 |
| 3,724,215 A | * | 4/1973 | Neudecker | 60/203 |
| 3,739,574 A | * | 6/1973 | Godfrey | 60/39.03 |
| 4,011,720 A | * | 3/1977 | Kirschner | 60/254 |
| 5,062,593 A | * | 11/1991 | Goddard | 244/169 |
| 5,765,367 A | * | 6/1998 | Denoel | 60/229 |

OTHER PUBLICATIONS

"Stability and Steering Response", Aeronautics and Space Technology Handbook, 2nd Edition, pp. 729–730 (with English abstract).

* cited by examiner

Primary Examiner—Ehud Gartenberg
(74) Attorney, Agent, or Firm—McDermott, Will & Emery

(57) ABSTRACT

A side thruster of a flying object of the invention is provided with a solid gas generating agent, a nozzle arranged in a direction perpendicular to an axis of the flying object, a tube body for flowing the gas generated in accordance with a combustion of the solid gas generating agent to the nozzle, the solid gas generating agent being arranged around the tube body, a plurality of orifices provided on a peripheral wall of the tube body along its circumferential direction and capable of injecting the gas generated in accordance with the combustion of the solid gas generating agent toward an axis of the tube body, and a valve provided within the tube body and rotatable around the axis of the tube body so as to open and close the plurality of orifices.

10 Claims, 5 Drawing Sheets

SIDE THRUSTER OF FLYING OBJECT

BACKGROUND OF THE INVENTION

The present invention relates to a side thruster of a flying object, and more particularly to a side thruster which uses, as an operating source, gas generated by combustion of a solid gas generating agent so as to change a moving direction of the flying object and control an attitude thereof.

"Aeronautics and Space Technology Handbook, Second Edition" (issued by Maruzen Co., Ltd. in Sep. 30, 1992) discloses in pages 729 to 730 that a side thruster can be applied to a controlling method for a flying object.

SUMMARY OF THE INVENTION

In accordance with consideration by the inventors of the present invention, there can be listed up, for example, a side thruster of a flying object provided with a combustion chamber in which a solid gas generating agent is charged, a nozzle arranged in a direction perpendicular to an axis of the flying object, a tube body for flowing gas generated in accordance with combustion of the solid gas generating agent within the combustion chamber to the nozzle, and a gas flow amount control mechanism arranged in a portion between the combustion chamber and the nozzle in the tube body.

Here, the gas flow amount control mechanism can employ a valve mechanism provided with a nozzle member fixed within the tube body and a pintle moving forward to and backward from a throat portion of the nozzle member so as to control a gas flow amount, and a valve mechanism provided with a drive shaft passing through the tube body in a diametrical direction and a rotary valve rotated by the drive shaft.

However, in the side thruster of the flying object, since a pressure of the gas acting on the pintle and the rotary valve and flowing through the tube body is concentrated in one direction, that is, since a load for preventing an axial movement is applied to the pintle and a load for preventing a rotation is applied to the rotary valve, it is considered that a large torque is required for driving the pintle and the rotary valve. This causes the matter that the size of the drive portion for driving the valve mechanism is correspondingly increased or the like, and is not preferable.

The present invention is made by taking the above matter into consideration, and an object of the present invention is to provide a side thruster of a flying object which can control a gas flow amount without requiring a great torque.

In accordance with the present invention, there is provided a side thruster of a flying object comprising: a solid gas generating agent; a nozzle arranged in a direction perpendicular to an axis of the flying object; a tube body flowing gas generated by combustion of the solid gas generating agent to the nozzle, the solid gas generating agent being arranged around the tube body; a plurality of orifices provided on a peripheral wall of the tube body along a circumferential direction thereof and capable of injecting the gas generated by the combustion of the solid gas generating agent toward an axis of the tube body; and a valve provided within the tube body and rotatable around the axis of the tube body so as to open and close the plurality of orifices.

In other words, in accordance with the present invention, there is provided a side thruster of a flying object comprising: a solid gas generating agent; a nozzle arranged in a direction perpendicular to an axis of the flying object; a tube body flowing the gas generated by combustion of the solid gas generating agent to the nozzle, the solid gas generating agent being arranged around the tube body; a plurality of orifices provided on a peripheral wall of the tube body along a circumferential direction thereof and capable of injecting the gas generated by combustion of the solid gas generating agent toward an axis of the tube body; and means provided within the tube body and rotatable around the axis of the tube body for opening and closing the plurality of orifices.

DETAILED DESCRIPTION OF THE PREFERRED EMBODIMENTS

A description will be in detail given below of each of embodiments of a side thruster of a flying object in accordance with the present invention properly with reference to the accompanying drawings.

At first, a description will be in detail given of a side thruster in accordance with a first embodiment of a flying object of the present invention with reference to FIGS. 1 to 5.

Figure 1:
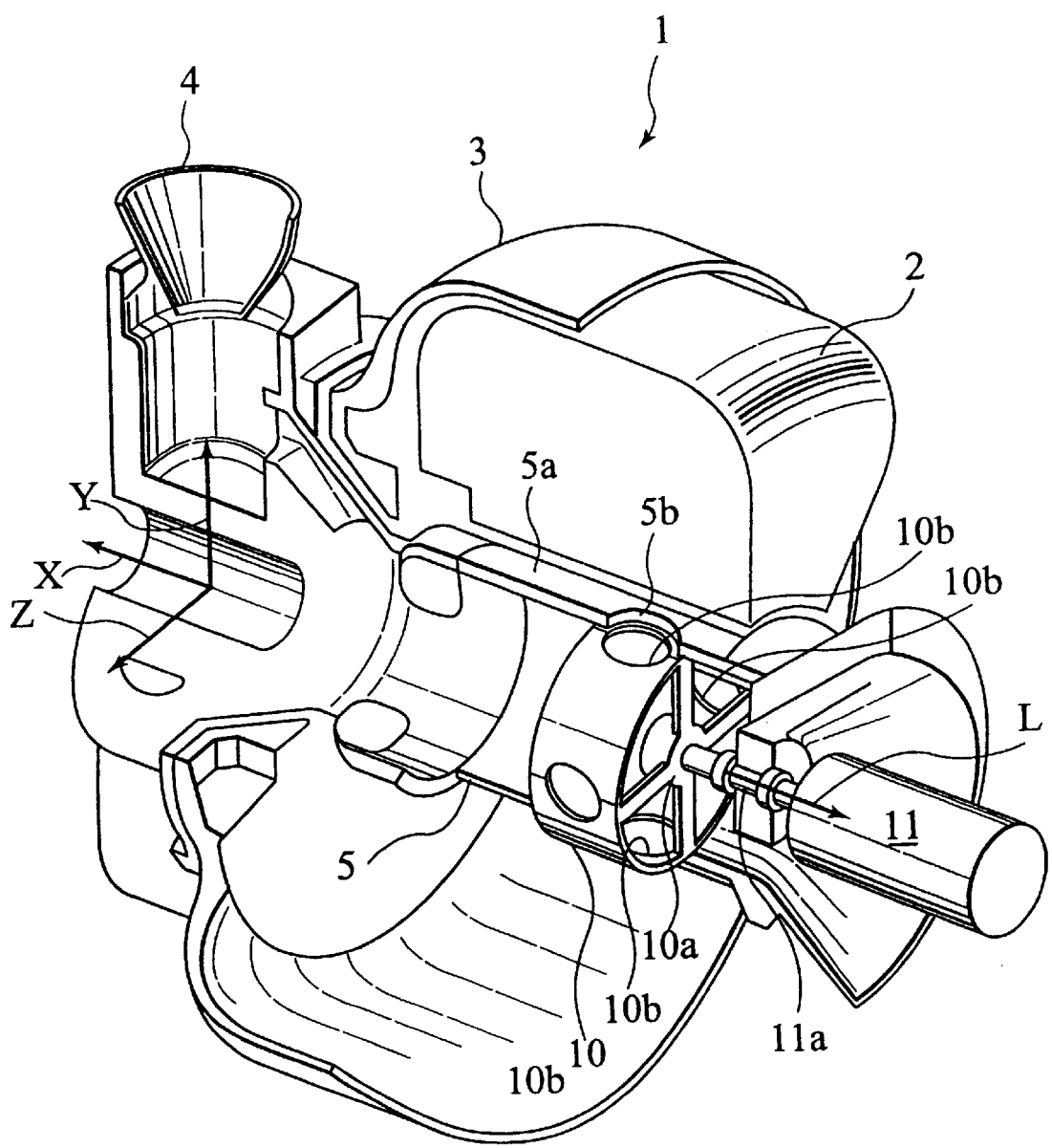
FIG. 1 is a perspective partly cross sectional view showing a side thruster of a flying body in accordance with a first embodiment of the present invention.
Figure 2:
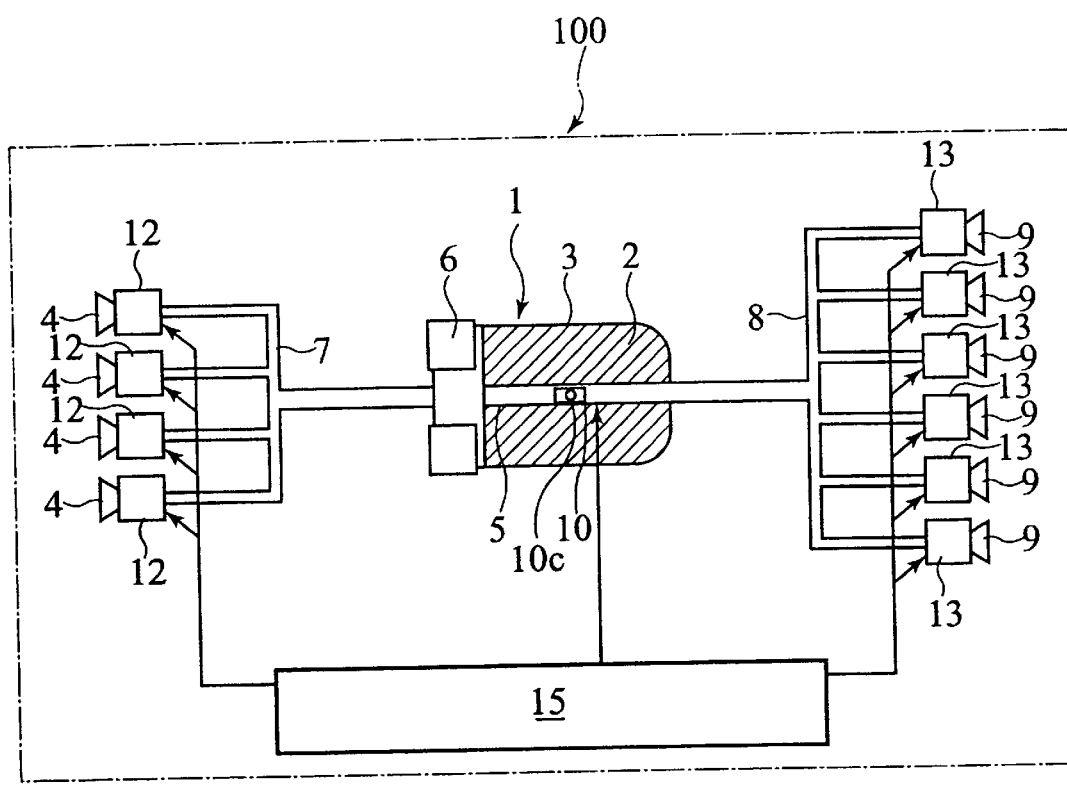
FIG. 2 is a block diagram of the side thruster in accordance with the embodiment.

As shown in FIGS. 1 and 2, a side thruster 1 of a flying object 100 is provided a combustion chamber 3 in which a solid gas generating agent 2 generating gas in accordance with a combustion is charged, four moving direction changing nozzles 4 arranged in an Y direction corresponding to a yaw axis of the flying object 100 and in a direction corresponding to a pitch axis (a direction perpendicular to a machine axis X), and a tube body 5 flowing the gas generated in accordance with the combustion of the solid gas generating agent 2 within the combustion chamber 3 to the nozzle 4. In this case, in FIG. 1, only the nozzle 4 in the Y direction corresponding to the yaw axis is representatively shown.

The solid gas generating agent 2 employs, for example, a solid propellant for a rocket motor or similar agents, and continuously burns in a proper manner while generating the gas when being ignited by an igniter 6.

The combustion chamber 3 is a pressure container formed in a cylindrical shape, and the tube body 5 is provided on the axis of the combustion chamber 3. That is, the solid gas generating agent 2 is arranged in the periphery of the tube body 5, four moving direction changing nozzles 4 are mounted to one end portion of the side thruster 1 via a manifold 7 of the tube body 5, and six attitude changing nozzles 9 are mounted to another end portion opposite to one end portion thereof via a manifold 8 of the tube body 5. In this case, six attitude changing nozzles 9 are shown only in FIG. 2.

Four orifices 5b for injecting the gas generated by the combustion of the solid gas generating agent 2 toward a center axis L of the tube body 5 are provided on a peripheral wall 5a of the tube body 5 at an interval of 90 degrees in a circumferential direction of the tube body 5, and a valve 10 formed in a cylindrical shape and brought into contact with the peripheral wall 5a of the tube body 5 is provided in an inner portion of the tube body 5.

In this case, it is preferable that the orifice 5b of the tube body 5 is provided so as to be axially symmetrical with respect to the center axis L of the tube body 5, a number and an interval thereof are not limited to those of the present embodiment and can be properly set.

The structure is made such that the valve 10 can rotate around the center axis L of the tube body 5 in accordance with an operation of the motor 11 by fixing a boss portion 10a provided in a center of the valve 10 to an output shaft 11a of the motor 11 provided on the center axis L of the tube body 5.

In particular, the valve 10 is provided with four valve side orifices 10b which are provided in a circumferential direction of the valve 10 at an interval of 90 degrees in correspondence to the orifices 5b of the tube body 5 and releases the orifices 5b by being overlapped with the orifices 5b. A flow amount of the gas injecting to the tube body 5 is controlled by changing the overlapping degree of the respective valve side orifices 10b with respect to the orifices 5b of the tube body 5. Of course, it is preferable that the valve side orifices 10b are provided so as to be axially symmetrical with respect to the center axis L of the tube body 5 in correspondence to the orifice 5b of the tube body 5, and the number and the interval of the valve side orifices 10b are not particularly limited to those of the present embodiment.

Figure 3A:
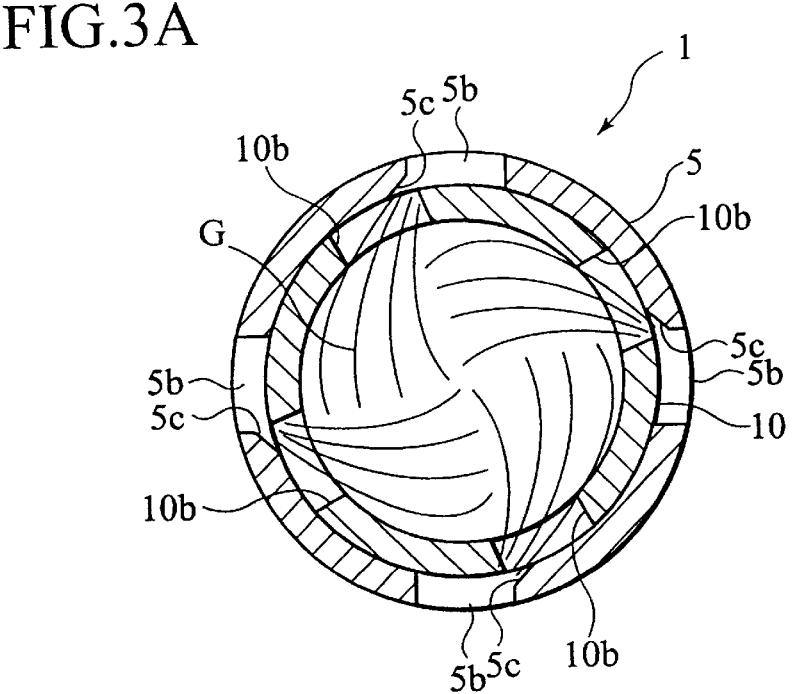
FIG. 3A is a cross sectional view showing a state that a valve portion of the side thruster shown in FIG. 1 is cut in a diametrical direction thereof.

Here, as shown in FIG. 3A, notches 5c formed by cutting the inner peripheral sides of the wall surfaces of the orifices 5b are provided in the respective orifices 5b of the tube body 5, thereby peeling out the gas G injecting toward the center axis L of the tube body 5 in an opposite side to the notches 5c in a state that the orifices 5b of the tube body 5 and the valve side orifices 10b are partly overlapped with each other. That is, the structure is made such that a drive force for the valve 10 can be further reduced by flowing the gas G along the notches 5c so as to peel out from the wall surfaces of the valve side orifices 10b, increasing a gas pressure by the peeled portion so as to balance a pressure applied to the wall surfaces of the valve side orifices 10b.

Figure 3B:
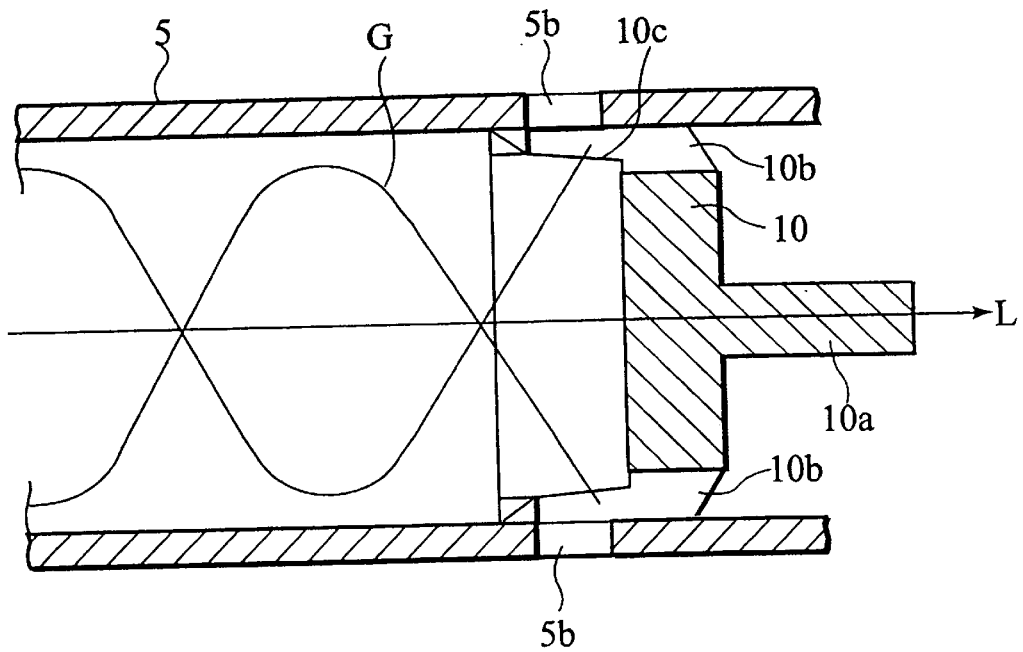
FIG. 3B is a cross sectional view showing a state that the valve portion of the side thruster shown in FIG. 1 is cut in an axial direction thereof.

On the contrary, as shown in FIG. 3B, an inner peripheral surface 10c of the valve 10 formed in a cylindrical shape is formed as a taper surface in which an inner diameter is gradually increased toward the moving direction changing nozzles 4 along the center axis L of the tube body 5, for flowing the gas G passing through the valve side orifice 10b in a substantially spiral manner.

In this case, it is desirable to employ a material such as a carbon fiber reinforced carbon composite material (C/C), a carbon fiber reinforced silicon carbide composite material (C/SIC), a silicon carbide fiber reinforced silicon carbide composite material (SIC/SIC), a tungsten, molybdenum, a zirconia or the like for the tube body 5 and the valve 10, in view of making the temperature of the gas generated in accordance with the combustion of the solid gas generating agent 2 further higher. Further, in the case of employing any one of C/C, C/SIC and SIC/SIC, it is possible to use the material as a single body, and further it is possible to partly employ a heat resisting alloy for the orifice and the protruding portion, so that in any cases, it is possible to well resist erosion.

Further, in FIG. 2, reference numeral 12 denotes a switch valve of the moving direction changing nozzle 4, reference numeral 13 denotes a switch valve of the attitude changing nozzle 9 and reference numeral 15 denotes a controller 15 batch controlling opening degrees of the gas flow amount controlling valve 10 and the respective switch valves 12 and 13 of the nozzles 4 and 9, respectively.

Next, a description will be given of an operation of the side thruster 1 of the flying object 100 in accordance with the present embodiment having the structure mentioned above.

In the side thruster 1 of the flying object 100, the solid gas generating agent 2 starts burning in accordance with an ignition by the igniter 6, and the gas generated in accordance with this combustion is fed to the nozzles 4 and 9 via the tube body 5 and is injected from these nozzles 4 and 9.

At this time, when the valve side orifices 10b of the valve 10 are overlapped with the orifices 5b of the tube body 5 so as to full open the orifices 5b, the combustion pressure of the solid gas generating agent 2 in the combustion chamber 3 is reduced. Since the combustion of the solid gas generating agent 2 is restricted in accordance therewith and the gas generating amount is reduced, the flow amount of the gas injected from the nozzles 4 and 9 is reduced. Accordingly, the specific fuel consumption can be reduced and the moving direction and the attitude of the flying object 100 are not affected.

Figure 4:
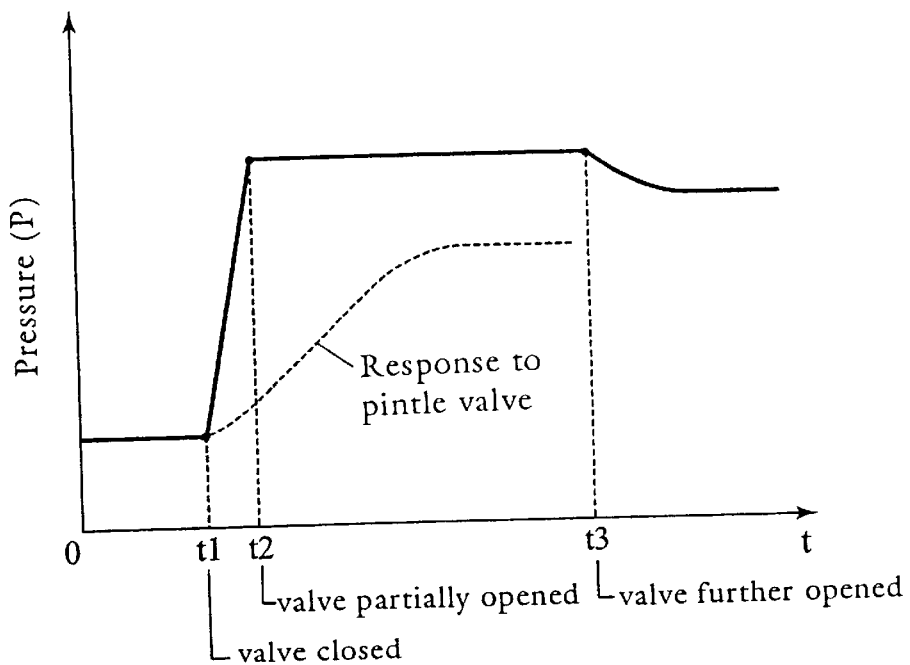
FIG. 4 is a graph, for showing a response of the valve in the side thruster in accordance with the embodiment, of a relation between a pressure P in a combustion chamber thereof and a time t.
Figure 5:
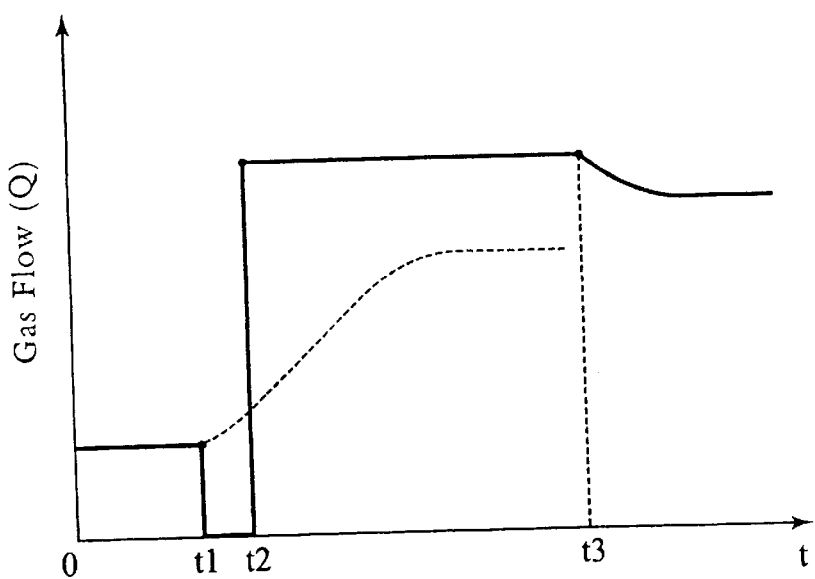
FIG. 5 is a graph, for showing a response of the valve in the side thruster in accordance with the embodiment, of a relation between a gas flow amount Q and a time t.

Next, in the case that it is necessary to change the moving direction and the attitude, the valve 10 is rotated so as to shift the valve side orifices 10b in a state of being overlapped with the orifices 5b of the tube body 5, thereby changing the orifices 5b of the tube body 5, for example, in a full closed state at a time $t_1$ in FIGS. 4 and 5. Then, as is typically shown in a graph of FIG. 4, a combustion pressure (a pressure within the combustion chamber) P of the solid gas generating agent 2 in the combustion chamber 3 is increased and the combustion is promoted. Next, after this state, when again partly overlapping the valve side orifices 10b with the orifices 5b of the tube body 5 at a time $t_2$ in FIGS. 4 and 5 so as to open the orifices, a gas generating amount (a gas flow amount) Q which is temporarily reduced is quickly increased, typically as shown in a graph of FIG. 5.

Accordingly, since the combustion pressure is maintained to be high for a predetermined time and a lot of gas is continuously injected into the tube body 5, it is possible to quickly change the moving direction and the attitude of the flying object 100 by operating the switch valves 12 and 13 during this time so as to properly inject the gas from the nozzles 4 and 9.

In this case, graphs after a time $t_3$ in FIGS. 4 and 5 respectively show changes with respect to time of the combustion pressure (the pressure within the combustion chamber) P and the gas generating amount (the gas flow amount) Q in a state of more overlapping the valve side orifices 10b with the orifices 5b of the tube body 5 so as to more open.

Further, in this case, portions shown by broken curves in the graphs of FIGS. 4 and 5 are shown so as to compare a response of the present embodiment with a response of a side thruster in which a valve mechanism provided with a pintle is arranged in a side of a moving direction changing nozzle of a tube body and a fixed orifice is arranged in a side of an attitude changing nozzle of the tube body.

In the side thruster having the comparative structure mentioned above, it is known that the pressure within the combustion chamber does not become high to a level of the side thruster 1 in accordance with the present embodiment because the fixed orifice is employed, and the gas flow amount is not increased to a level of the side thruster 1 in a moment.

As mentioned above, in the side thruster 1 in accordance with the present embodiment, it is possible to change the moving direction and the attitude of the flying object 100 with a very good response.

Further, in the side thruster 1 in accordance with the present embodiment, the gas generated in accordance with the combustion of the solid gas generating agent 2 is injected toward the center axis L of the tube body 5 through a plurality of orifices 5b arranged on the peripheral wall 5a of the tube body 5 at an interval of 90 degrees in a circumferential direction. Accordingly, the pressures of the gas passing through a plurality of orifices 5b deny with each other. Further, since the valve 10 for opening and closing the orifices 5b rotates around the center axis L of the tube body 5, the torque required for driving the valve 10 is significantly reduced, so that the driving power source and the motor 11 can be effectively made compact.

Further, when the nozzles 4 and 9 are respectively arranged not only in one end portion of the tube body 5 but also in both end portions, as the side thruster 1 in accordance with the present embodiment, the gas having the flow amount controlled by driving the valve 10 is supplied to each of the nozzles 4 and 9 in both end portions, that is, the gas flow amount can be controlled by only one valve 10. Accordingly, as mentioned above, since the gas flow amount can be controlled by only one valve 10 in addition that the response of the gas flow amount control is improved, whereby the specific fuel consumption is improved, a space efficiency is increased and a freedom of design is effectively increased.

Further, in the side thruster 1 in accordance with the present embodiment, since the notch 5c is provided in the orifices 5b of the tube body 5, the load applied to the valve 10 due to the overlapping in the case of partly overlapping the orifices 5b of the tube body 5 with the valve side orifices 10b so as to control the gas flow amount. In addition, the flow of the gas passing through the valve side orifices 10b toward the center axis L of the tube body 5 in a direction opposing to the notch 5c is peeled out, and the pressure applied to the inner peripheral surface of the valve side orifices 10b becomes substantially uniform. Accordingly, due to the combination of these structure, the torque required for driving the valve 10 is further reduced.

Further, in the side thruster 1 in accordance with the present embodiment, since the inner peripheral surface 10c of the valve 10 formed in a cylindrical shape is formed as a taper surface in which an inner diameter is gradually increased toward the moving direction changing nozzle 4, the gas passing through the valve side orifices 10b spirally flows within the tube body 5. Accordingly, a loss of a kinetic energy of the gas is reduced, and a mixing loss can be reduced.

Figure 6:
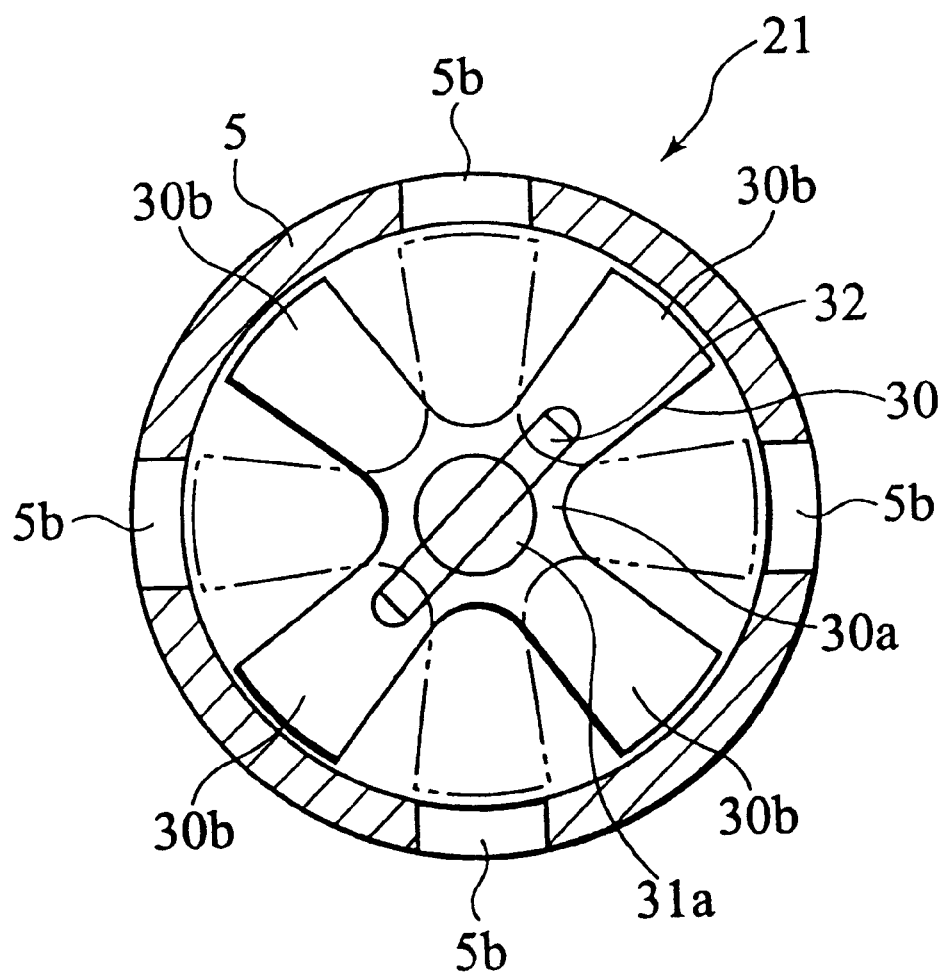
FIG. 6 is a front elevational view substantially corresponding to FIG. 3A and showing a valve, formed in a cross shape, of a side thruster of a flying object in accordance with a second embodiment of the present invention.

Next, a description will be in detail given of a side thruster in accordance with a second embodiment of a flying object of the present invention with reference to FIG. 6.

A side thruster 21 in accordance with the present embodiment is different from the side thruster 1 in accordance with the first embodiment in view that a valve 30 provided within the tube 5 is provided with protruding portions 30b for closing a plurality of orifices 5b in the tube body 5 and is wholly formed in a cross shape, and the other structures of the side thruster 21 are the same as those of the side thruster 1 in the first embodiment. Accordingly, the present embodiment will be described with paying attention to the different point mentioned above, and the description of the same structures will be briefly given or omitted.

As shown in FIG. 6, the valve 30 of the side thruster 21 is structured such that a boss portion 30a disposed in a center thereof is fixed to an output shaft 31a of a motor (not shown) provided on the center axis L of the tube body 5 via a pin 32, whereby the valve 30 is rotated around the center axis L of the tube body 5 in accordance with an operation of the motor.

In particular, as shown by a phantom line in FIG. 6, the structure is made such that the flow amount of the gas injecting to the tube body 5 can be controlled by aligning the protruding portions 30b with the orifices 5b of the tube body 5 so as to change an overlapping degree.

Accordingly, also in the side thruster 21 in accordance with the present embodiment, since the gas generated in accordance with the combustion of the solid gas generating agent 2 is injected toward the center axis L of the tube body 5 through a plurality of orifices 5b of the tube body 5, the pressures of the gas are denied with each other. In addition, since the valve 30 for opening and closing the orifices 5b rotates around the center axis L of the tube body 5, the torque required for driving the valve 3 becomes widely reduced.

Further, in accordance with the side thruster 21 in accordance with the present embodiment, a response of the gas flow amount control is improved, the specific fuel ratio is improved, the space efficiency is increased and the freedom of design is increased. In addition, the structure can be made simple.

The entire contents of a Patent Application No. TOKUGANHEI 11-279227 with a filing date of Sep. 30, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A side thruster of a flying object comprising:
   a solid gas generating agent;
   a nozzle arranged in a direction perpendicular to an axis of the flying object;
   a tube body flowing gas generated by combustion of the solid gas generating agent to the nozzle, the solid gas generating agent being arranged around the tube body;
   a plurality of orifices provided on a peripheral wall of the tube body along a circumferential direction thereof and capable of injecting the gas generated by the combustion of the solid gas generating agent toward an axis of the tube body; and
   a valve provided within the tube body and rotatable around the axis of the tube body so as to open and close the plurality of orifices.

2. A side thruster of a flying object according to claim 1, wherein the valve is formed in a cylindrical shape being contact with the peripheral wall of the tube body, and is provided with valve side orifices overlapping with the plurality of orifices of the tube body so as to open the plurality of orifices of the tube body.

3. A side thruster of a flying object according to claim 2, wherein a notch peeling out a flow of the gas injected toward the axis of the tube body in a state of partly overlapping the plurality of orifices of the tube body with the valve side orifices is provided in each of the plurality of orifices of the tube body.

4. A side thruster of a flying object according to claim 3, wherein the notch provided in each of the orifices of the tube body is formed by cutting an inner peripheral side of a wall surface of each of the plurality of orifices of the tube body, and the notch peels out the flow of the gas from the wall surface of each of the plurality of orifices of the tube body.

5. A side thruster of a flying object according to claim 2, wherein the inner peripheral surface of the valve formed in the cylindrical shape is a taper surface.

6. A side thruster of a flying object according to claim 5, wherein the taper surface of the inner peripheral surface of the valve is structured such that an inner diameter of the inner peripheral surface of the valve is gradually increased toward the nozzle along the axis of the tube body.

7. A side thruster of a flying object according to claim 1, wherein the valve is provided with a plurality of protruding portions capable of closing the plurality of orifices of the tube body.

8. A side thruster of a flying object according to claim 1, wherein a plurality of moving direction changing nozzles arranged in one end portion side of the tube body and a plurality of attitude controlling nozzles arranged in another end portion side of the tube body are provided as the nozzle.

9. A side thruster of a flying object according to in claim 1, wherein the plurality of orifices of the tube body are respectively provided at an axially symmetrical position with respect to the axis of the tube body, and the valve side orifices are provided in correspondence to the plurality of orifices of the tube body.

10. A side thruster of a flying object comprising:

a solid gas generating agent;

a nozzle arranged in a direction perpendicular to an axis of the flying object;

a tube body flowing the gas generated by combustion of the solid gas generating agent to the nozzle, the solid gas generating agent being arranged around the tube body;

a plurality of orifices provided on a peripheral wall of the tube body along a circumferential direction thereof and capable of injecting the gas generated by combustion of the solid gas generating agent toward an axis of the tube body; and means provided within the tube body and rotatable around the axis of the tube body for opening and closing the plurality of orifices.

* * * * *